United States Patent
VanBlon et al.

(10) Patent No.: US 10,579,360 B2
(45) Date of Patent: Mar. 3, 2020

(54) APPLICATION UPDATE CONTROL

(71) Applicant: LENOVO (Singapore) PTE. LTD., New Tech Park (SG)

(72) Inventors: Russell Speight VanBlon, Raleigh, NC (US); Grigori Zaitsev, Durham, NC (US); Jianbang Zhang, Cary, NC (US)

(73) Assignee: LENOVO (Singapore) PTE. LTD., New Tech Park (SG)

( * ) Notice: Subject to any disclaimer, the term of this patent is extended or adjusted under 35 U.S.C. 154(b) by 191 days.

(21) Appl. No.: 15/355,373

(22) Filed: Nov. 18, 2016

(65) Prior Publication Data

US 2018/0143822 A1    May 24, 2018

(51) Int. Cl.
    *G06F 8/65*      (2018.01)
    *G06F 8/658*     (2018.01)

(52) U.S. Cl.
    CPC ............... *G06F 8/65* (2013.01); *G06F 8/658* (2018.02)

(58) Field of Classification Search
    CPC .................................. G06F 8/65; G06F 8/658
    USPC .................................................. 717/168–173
    See application file for complete search history.

(56) References Cited

U.S. PATENT DOCUMENTS

| | | | |
|---|---|---|---|
| 7,707,573 B1 * | 4/2010 | Marmaros | G06F 8/61 709/224 |
| 10,114,637 B1 * | 10/2018 | Willson | G06F 8/71 |
| 2005/0222892 A1 * | 10/2005 | Sutherland | G06Q 10/0635 705/7.28 |
| 2006/0080656 A1 * | 4/2006 | Cain | G06F 8/65 717/174 |
| 2009/0204946 A1 * | 8/2009 | Fienblit | G06F 8/71 717/124 |
| 2009/0249321 A1 * | 10/2009 | Mandyam | G06F 8/65 717/171 |
| 2011/0054776 A1 * | 3/2011 | Petrov | G01C 21/3694 701/533 |
| 2011/0072492 A1 * | 3/2011 | Mohler | G06F 3/04817 726/3 |
| 2012/0265804 A1 * | 10/2012 | Ashcraft | G06F 9/5016 709/203 |
| 2013/0042230 A1 * | 2/2013 | Little | G06F 8/65 717/173 |
| 2013/0159985 A1 * | 6/2013 | Gilman | G06F 8/65 717/168 |
| 2014/0223423 A1 * | 8/2014 | Alsina | G06F 8/65 717/173 |
| 2014/0282476 A1 * | 9/2014 | Ciudad | G06F 8/65 717/171 |
| 2014/0282480 A1 * | 9/2014 | Matthew | G06F 8/60 717/172 |
| 2015/0095281 A1 * | 4/2015 | Nieminen | G06F 16/2379 707/618 |

(Continued)

*Primary Examiner* — Qing Chen
(74) *Attorney, Agent, or Firm* — Kunzler Bean & Adamson, PC

(57) ABSTRACT

For controlling application updates, an apparatus is disclosed. A system, method, and program product also perform the functions of the apparatus. The apparatus includes a processor and a memory storing code executable by the processor. The processor identifies one or more updatable applications installed on the apparatus and identifies a pattern of use for each updatable application. The processor also creates an application update policy for each updatable application based on the pattern of use for each updatable application.

20 Claims, 7 Drawing Sheets

(56) References Cited

U.S. PATENT DOCUMENTS

| | | | |
|---|---|---|---|
| 2015/0205595 A1* | 7/2015 | Dudai | G06F 8/65 |
| | | | 717/168 |
| 2015/0227360 A1* | 8/2015 | Kim | G06F 8/65 |
| | | | 717/169 |
| 2016/0085763 A1* | 3/2016 | Tatourian | H04L 67/10 |
| | | | 707/662 |
| 2016/0132323 A1* | 5/2016 | Garratt | G06F 8/65 |
| | | | 717/173 |
| 2016/0291965 A1* | 10/2016 | Li | G06F 8/65 |

* cited by examiner

300

| App. ID 305 | App. Name 310 | Usage Statistics 315 | App. Type 320 |
|---|---|---|---|
| ID_1 | Application_1 | [date/time of use, duration of use, location of use, ...] | Messaging |
| ID_2 | Application_2 | [date/time of use, duration of use, location of use, ...] | Media |
| ID_3 | Application_3 | [date/time of use, duration of use, location of use, ...] | Gaming |
| ID_4 | Application_4 | [date/time of use, duration of use, location of use, ...] | Gaming |
| ⋮ | ⋮ | ⋮ | ⋮ |
| ID_n | Application_n | [date/time of use, duration of use, location of use, ...] | Productivity |

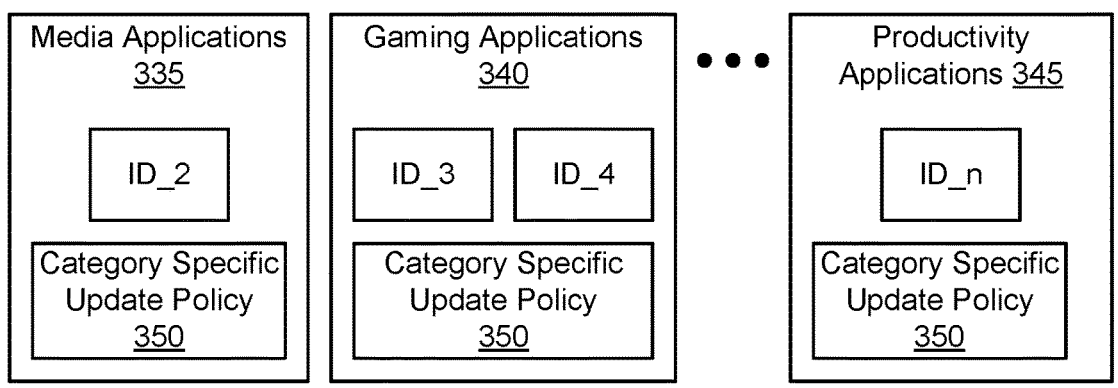

APPLICATION UPDATE CONTROL

FIELD

The subject matter disclosed herein relates to updating applications installed on an electronic device and more particularly relates to intelligently controlling application updates.

BACKGROUND

Many applications are application updated throughout their lifetime to fix bugs, apply security patches, and/or add new features. Some operating systems and/or application managers periodically check for available application updates, and then automatically download and install/apply an available application update. However, for a rarely used application, an automatic application update is often unnecessary and results in increased data usage and battery usage, and decreased performance.

BRIEF SUMMARY

An apparatus for controlling application updates is disclosed. A method and computer program product also perform the functions of the apparatus.

The apparatus for controlling application updates includes a processor, a memory that stores code executable by the processor. The processor identifies one or more updatable applications installed on the apparatus and identifies a pattern of use for each updatable application. The processor also creates an application update policy for each updatable application based on the pattern of use for each updatable application.

In some embodiments, the processor further categorizes the one or more updatable applications into one of a plurality of application categories. In such an embodiment, each application in an application category will have a common application update policy (e.g., the same policy). In certain embodiments, creating an application update policy for each updatable application based on the pattern of use of each updatable application includes disabling an automatic application update feature for a particular application in response to the pattern of use for the particular application indicating a frequency of use below a threshold amount.

In some embodiments, the processor receives an application update for a specific application, where the pattern of use for the specific application indicates a rate of use less than a first threshold. In such embodiments, the processor determines whether the application update is a major revision. The processor applies the application update in response the application update being a major revision. Otherwise, the processor postpones the application update in response to the application update not being a major revision.

In one embodiment, the processor further identifies a calendar item associated with the use of a specific application. In such an embodiment, the application update policy defers application updates for the specific application until a predetermined time prior to the calendar item. In another embodiment, the processor identifies a location associated with the use of a specific application. In such an embodiment, the application update policy defers application updates for the specific application until the apparatus is within a predetermined distance of the identified location.

In some embodiments, the processor receives an application update for particular application and determines whether the application update is a security update. In response to the received application update being a security update, the processor overrides an application update policy associated with the particular application and immediately updates the particular application. In certain embodiments, the processor further identifies one or more features of an updatable application, each feature being independently updatable. In such embodiments, the processor further identifies a pattern of use for each feature, such that creating an application update policy for the updatable application includes creating a feature update policy for each feature of the updatable application based on a pattern of use for each feature.

In one embodiment, the application update policy for first updatable application applies application updates to the first updatable application at a first frequency and the application update policy of a second updatable application applies application updates to the second updatable application at a second frequency. In such an embodiment, the first frequency may be greater than the second frequency in response the first date updatable application being used more often than the second updatable application.

A method for controlling application updates at a computing device includes identifying, using a processor, one or more updatable applications installed on the computing device. The method includes identifying a pattern of use for each updatable application. The method also includes creating an application update policy for each updatable application based on the pattern of use for each updatable application. In some embodiments, the method further includes categorizing the one or more updatable applications into one of the plurality of application categories. In such embodiments, each application in an application category has the same application update policy (e.g., each uses a common policy).

In some embodiments, the method includes receiving an application update for a specific application having a rate of use that is less than a threshold rate. The method further includes determining whether the application update is a major revision. In response to the application update being a major revision, the method includes applying the application update. Otherwise, in response to the application update not being a major revision, the method includes postponing the application update.

In one embodiment, the method includes identifying a calendar item associated with the use of a specific application. In such an embodiment, the application update policy for the specific application may defer applying application updates until a predetermined time prior to the calendar item. In another embodiment, the method includes identifying a location associated with the use of a specific application. In such an embodiment, the application update policy for the specific application may differ applying application updates until the computing device is within a predetermined distance of the location.

In some embodiments, the method includes receiving an application update for a particular application and determining with the application update is a security update. In such embodiments, the method includes overwriting the application update policy to immediately update the particular application in response to the receipt application update being a security update.

In certain embodiments, the method includes identifying one or more features of an updatable application, each feature being independently updatable, and identifying a pattern of use for each feature. In such embodiments, creating an application update policy for the updatable application includes creating a feature update policy for each feature of the updatable application based on a pattern of use for each feature. In further embodiments, the feature update policy for first feature may cause the first feature to be updated at a first interval and a feature update policy of the second feature may cause the second feature to be updated at a second interval, the first interval being less than the second interval in response to the first feature being used more often than the second feature.

A program product for controlling application updates at an electronic device includes a computer readable storage medium that stores code executable by a processor. The executable code includes code to perform: identifying one or more updatable applications installed on the electronic device, identifying a pattern of use for each updatable application, and creating an application update policy for each updatable application based on the pattern of use of each updatable application.

In some embodiments, creating an application update policy for each updatable application based on the pattern of use for each updatable application includes enabling an automatic application update function for a particular application only in response to a frequency of use of the particular application being above the threshold amount. In other embodiments, creating an application update policy for each updatable application based on the pattern of use for each updatable application includes disabling an automatic application update function for a particular application in response a frequency of use of the particular application being below the threshold amount.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 3A is a diagram illustrating one embodiment of an activity log used for controlling application updates;

FIG. 3B is a diagram illustrating various application categories used for controlling application updates;

DETAILED DESCRIPTION

Figure 1:
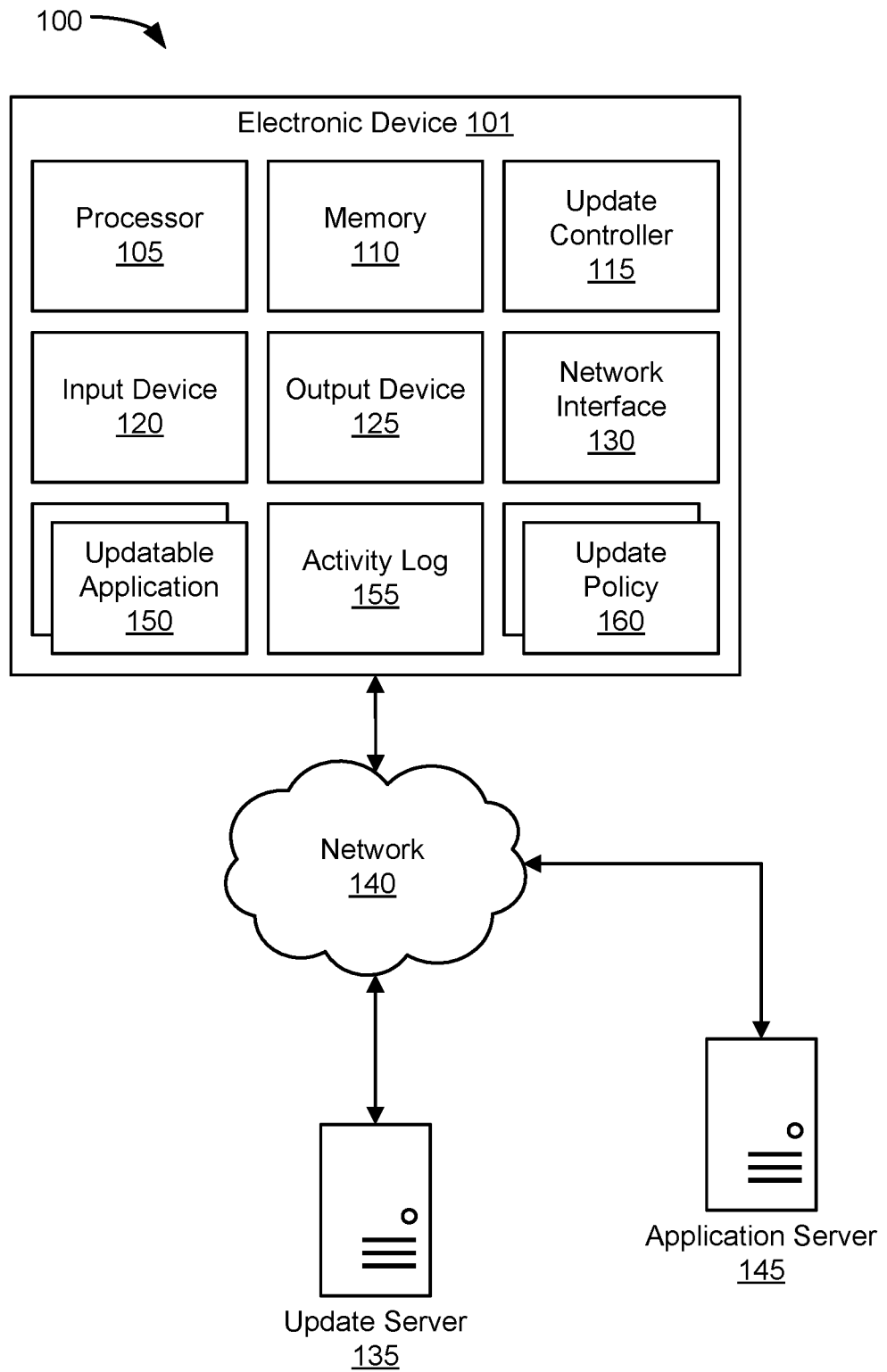
FIG. 1 is a schematic block diagram illustrating one embodiment of a system for controlling application updates.

As will be appreciated by one skilled in the art, aspects of the embodiments may be embodied as a system, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine-readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

The present disclosure describes systems, apparatus, and methods for controlling application updates. Generally, the systems, apparatus, and methods adjust the rate or frequency at which an application is updates based on how a user uses (or is expected to use) their device. For example, if the user never launches a first application, then an auto-update feature of the first application may be disabled completely. As another example, if the user rarely uses a second application, then the second application may be updated at a less frequent interval. In some situations, only major revisions will be applied to the second application while minor revisions will be ignored or postponed. In other situations, the second application will be updated only once per quarter, instead of once per week or once per month.

As some applications are only used in certain situations, the disclosed embodiments may provide for differing updates and automatically updating applications predetermined time before their use is expected. For example, certain applications may only be used when the users traveling away from home, when the user is near certain people, and the like. In certain circumstances, the user's calendar may contain information relating to expected activities. Additionally, usage history may be analyzed to anticipate an application's use.

Moreover, updates may only be applied to applications that are frequently used by the user or certain categories of applications that the user most often uses, such as games, messaging applications, productivity applications, and the like. Available updates may be filtered and only those containing security updates and/or updates to an application feature the user uses may be applied what is available, while updates to unused features of an application may be deferred. For example, if updates to an application are generally made available on a weekly basis, updates to the unused features may be deferred so as to occur at a lower frequency, such as once per month, once per quarter, etc. data relating to used/unused features of application may be available in application metadata, and may be parsed by either the client device or an application server (e.g., in the cloud) depending on where knowledge of the users activities managed.

FIG. 1 is a schematic block diagram illustrating a system 100 for controlling application updates, according to embodiments of the disclosure. The system 100 includes an electronic device 101 that communicates with an update server 135 via a network 140. The electronic device 101 receives updates from the update server 135 for one or more applications installed on the electronic device 101. In certain embodiments, the system 100 also includes an application server 145 that provides data, services, program code, and the like for running an application on the electronic device 101. The application server 145 may additionally gather usage information for the application.

In some embodiments, the electronic device 101 is a computing device, such as a personal computer, mainframe, server, terminal station, laptop computer, desktop computer, tablet computer, smartphone, and the like. In the depicted embodiment, the electronic device 101 includes a processor 105, a memory 110, an update controller 115, an input device 120, an output device 125, and a network interface 130.

The processor 105, in one embodiment, may comprise any known controller capable of executing computer-readable instructions and/or capable of performing logical operations. For example, the processor 105 may be a microcontroller, a microprocessor, a central processing unit (CPU), a graphics processing unit (GPU), an auxiliary processing unit, a FPGA, an integrated circuit, or similar controller. In certain embodiments, the processor 105 may include multiple processing units, such as multiple processing cores, multiple CPUs, multiple microcontrollers, or the like. In some embodiments, the processor 105 executes instructions stored in the memory 110 to perform the methods and routines described herein. The processor 105 is communicatively coupled to the memory 110, the update controller 115, the input device 120, the output device 125, and the network interface 130.

The memory 110, in one embodiment, is a computer readable storage medium. In some embodiments, the memory 110 includes volatile computer storage media. For example, the memory 110 may include a random access memory (RAM), including dynamic RAM (DRAM), synchronous dynamic RAM (SDRAM), and/or static RAM (SRAM). In some embodiments, the memory 110 includes non-volatile computer storage media. For example, the memory 110 may include a hard disk drive, a flash memory, or any other suitable non-volatile computer storage device. In some embodiments, the memory 110 includes both volatile and non-volatile computer storage media.

In some embodiments, the memory 110 stores data relating to verifying the integrity of a physical document. For example, the memory 110 may store lists of installed applications, activity log(s) 155, update policies, and the like. Additionally, the memory 110 stores one or more applications installed on the electronic device 101 and executed using the processor 105, including updatable applications 150. In some embodiments, the memory 110 also stores executable code and related data, such as an operating system or other controller algorithms operating on the electronic device 101.

The update controller 115, in one embodiment, identifies one or more updatable applications 150 installed on the electronic device 101, determines a pattern of use for each updatable application 150, and creates an application update policy 160 for each updatable application 150 based on the pattern of use of each updatable application 150, such that updatable applications 150 that are used more often are updated more often than those used less often. The pattern of use may be a rate or frequency of use, a location correlated with use of the application, certain individuals or devices whose presence is correlated with use of the application, and the like.

In certain embodiments, the update controller 115 identifies an application's correlated with use of the application of use by analyzing one or more activity logs 155. In one embodiment, the update controller 115 assigns each updatable application 150 to an application category. Here, each application in an application category may have the same application update policy 160.

In some embodiments, the update controller 115 disables an automatic update feature for a particular application in response to the frequency of use for that particular application being below a threshold amount. Additionally, the update controller 115 may receive an update for an installed application, determine whether the update is a significant update (e.g., a security update, a major revision, or the like), and override the application update policy 160 to update the installed application when to the received update is a security update. In certain embodiments, the update controller 115 may identify independently updatable features within an updatable application and update the independently updatable features based on their frequency of use.

Embodiments of the update controller 115 are described in further detail below. In some embodiments, the update controller 115 may be implemented as a hardware circuit (e.g., a controller, a custom VLSI circuit or gate array, a logic chip, integrated circuit, or the like), a programmable logic device (e.g., a field programmable gate array, a programmable array logic, programmable logic devices, or the like), program code (e.g., software, firmware, device driver, or the like) stored in the memory 110 and executed on the processor 105, or combinations thereof.

The input device 120 and output device 125 facilitate interaction between the user and the electronic device 101. The input device 120, in one embodiment, may include any known computer input device including a touch panel, a button, a keyboard, a stylus, a microphone, or the like. In some embodiments, the input device 120 may be integrated with the output device 125, for example, as a touchscreen or similar touch-sensitive display. In some embodiments, the input device 120 includes two or more different input devices, such as a touch panel and one or more additional buttons/keys.

The output device 125, in one embodiment, is designed to output visual, audible, and/or haptic signals perceivable by a user. In some embodiments, the output device 125 includes any known electronically controllable display or display device capable of outputting visual data to a user, including, but is not limited to, an LCD display, an LED display, an OLED display, a projector, or similar display device capable of outputting images, text, or the like to a user. As another, non-limiting example, the output device 125 may include a wearable display such as a smart watch, smart glasses, a heads-up display, or the like. Further, the output device 125 may include a component of a smart phone, a personal digital assistant, a television, a table computer, a notebook (laptop) computer, a personal computer, a vehicle dashboard, or the like.

In certain embodiments, the output device 125 includes one or more speakers for producing sound. For example, the output device 125 may produce an audible alert or notification (e.g., a beep or chime). In some embodiments, the output device 125 includes one or more haptic devices for producing vibrations, motion, or other haptic feedback. In some embodiments, at least a portion of the input device 120 and/or output device 125 may be a headphone, headset, handset, earphone, earpiece, eyepiece, or similar device located remotely and/or separable from the electronic device 101. The output device 125 may receive data (e.g., audio/visual data) from the processor 105, the memory 110, and/or the update controller 115 for presenting to the user.

The network interface 130 may include communication hardware and/or software. In some embodiments, the network interface 130 configured to establish key medication links with one or more endpoints via the network 140. The network interface 130 may communicate using wired and/or wireless communication links. For example, the network interface 130 may establish a wireless connection via a mobile telephone network. In some embodiments, the wireless connection may employ a Wi-Fi network based on any one of the Institute of Electrical and Electronics Engineers (IEEE) 802.11 standards. Alternatively, the wireless connection may be a BLUETOOTH® connection. In addition, the wireless connection may employ a Radio Frequency Identification (RFID) communication including RFID standards established by the International Organization for Standardization (ISO), the International Electrotechnical Commission (IEC), the American Society for Testing and Materials (ASTM), the DASH7 Alliance, and EPCGlobal.

Alternatively, the wireless connection may employ a ZigBee connection based on the IEEE 802 standard. In one embodiment, the wireless connection employs a Z-Wave connection as designed by Sigma Designs. Alternatively, the wireless connection may employ an ANT and/or ANT+ connection as defined by Dynastream Innovations Inc. of Cochrane, Canada.

The wireless connection may be an infrared connection including connections conforming at least to the Infrared Physical Layer Specification (IrPHY) as defined by the Infrared Data Association (IrDA). Alternatively, the wireless connection may be a cellular telephone network communication. All standards and/or connection types include the latest version and revision of the standard and/or connection type as of the filing date of this application.

The update server 135 is a computing device configured to store and transmit one or more application updates. In certain embodiments, the update server 135 signals the electronic device 101 when an update is available for an application installed on the electronic device 101. Alternatively, the electronic device 101 may periodically query the update server 135 to determine whether an update is available for an application installed on the electronic device 101.

While only a single update server 135 is shown, in other embodiments the electronic device 101 may receive updates from multiple update servers 135 via the network 140. For example, each author or producer of an application installed an electronic device 101 may have a separate update server 135 used to communicate updates for that application. In certain embodiments, updates for a plurality of applications may be aggregated at a single update server 135 and from there communicated to the electronic device 101. Additionally, the update server 135 may serve a plurality of electronic devices 101. While the update server 135 is depicted as a separate server than the application server 145, in certain embodiments the update server 135 and the application server 145 are co-located or the same server.

Figure 2:
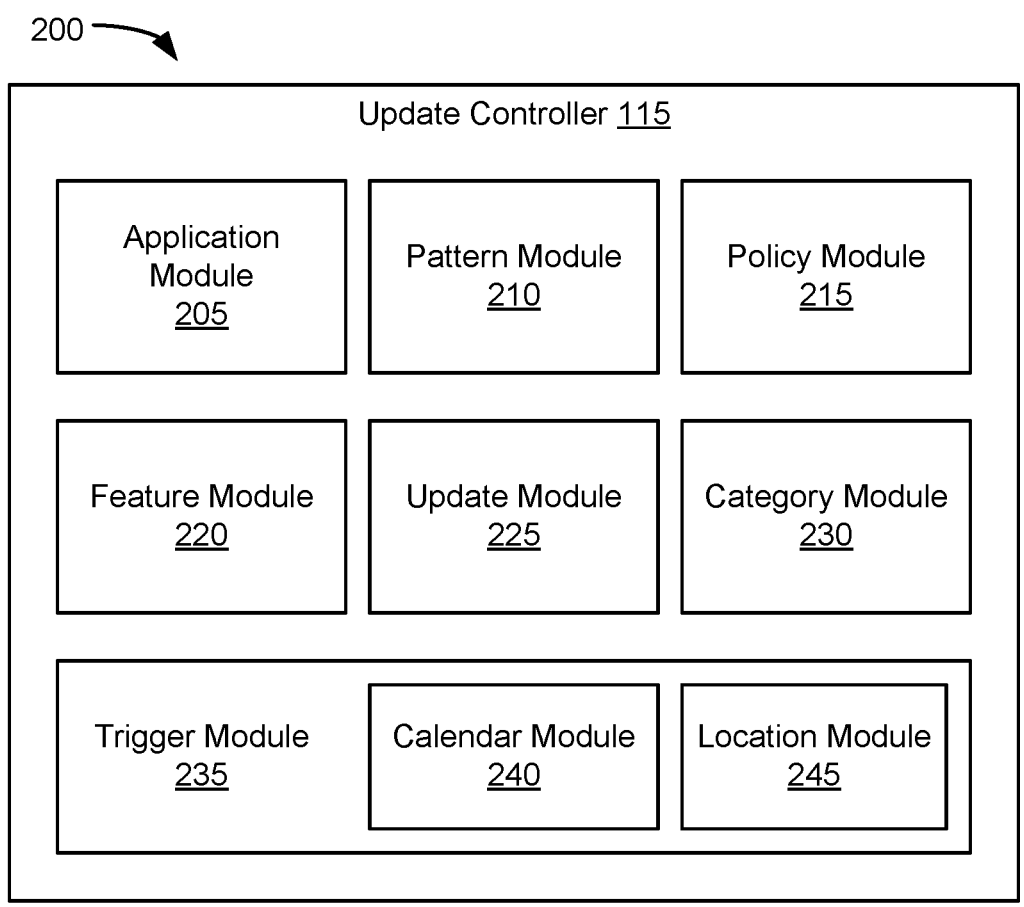
FIG. 2 is a schematic block diagram illustrating one embodiment of an apparatus for controlling application updates.

FIG. 2 is a schematic block diagram illustrating an apparatus 200 for controlling application updates, according to embodiments of the disclosure. The apparatus 200 includes an update controller 115, which may be one embodiment of the update controller 115 described above with reference to FIG. 1. The update controller 115 includes an application module 205, a pattern module 210, and a policy module 215. As depicted, the update controller 115 may also include a feature module 220, an update module 225, a category module 230, and a trigger module 235. Additionally, the trigger module 235 may include a calendar module 240 and/or a location module 245. The modules 205-245 may be communicatively coupled to one another. The update controller 115 may comprise hardware circuits, executable code operating on a processing device, or a combination of hardware circuitry and executable code.

The application module 205, in one embodiment, identifies one or more updatable applications install on the electronic device 101. In certain embodiments, the application module 205 accesses a list of applications installed on the electronic device 101. For example, a listing of applications may be generated by an operating system running on the electronic device 101 or by an application server 145. Alternatively, the application module 205 may generate a list of applications installed on the electronic device 101 by monitoring for applications being installed/uninstalled, cataloging the applications installed on the electronic device 101, and the like.

For each application installed on the electronic device 101, the application module 205 determines whether the application is updatable. As used herein, and updatable application refers to an application that regularly receives application updates from its producer/distributor. Application updates may be security updates (e.g., security patches), may add, remove, or otherwise update features within an application, and the like.

In some embodiments, the application module 205 analyzes metadata of an installed application to determine whether the application is updatable. In certain embodiments, the application module 205 may query a server (such as the update server 135 or application server 145) to determine whether the application is updatable. In other embodiments, the application module 205 may analyze history of an installed application in order to determine whether it is updatable. For example, each application may be assumed to be a non-updatable application until an application update is received. The application module 205 may comprise hardware circuits, executable code operating on a processing device, or a combination of hardware circuitry and executable code.

The pattern module 210, in one embodiment, determines the pattern of use for each updatable application. As used herein, the pattern of use refers to a usage rate or frequency and/or circumstance (e.g., locations, times, nearby persons or devices) of the use of the application by the user or another application on the electronic device 101. For example, the pattern of use may be described as an average number of times per timeframe (e.g., per day, per week, per month, etc.) that the user interacts with the application. Application interactions may include opening the application, executing the application, opening a file using the application, receiving and/or acknowledging notifications generated by the application, and the like.

In one embodiment, the pattern module 210 determines the pattern of use for each updatable application by querying an operating system or an application manager running on the electronic device 101 for application usage statistics. In another embodiment, the pattern module 210 determines the pattern of use for each updatable application by querying each updatable application for application usage statistics.

In certain embodiments, the electronic device 101 includes an activity log 155 storing usage statistics for applications on the electronic device 101. The activity log 155 may be created by the operating system, by the update controller 115, or by any suitable application manager. In certain embodiments, the activity log 155 may be downloaded from an application server that collects application usage information for the electronic device 101. The pattern module 210 may analyze the activity log 155 in order to determine the pattern of use for each updatable application. Activity log analysis is described in further detail with reference to FIG. 3A, below.

In some embodiments, the pattern module 210 may classify an application based on a frequency of use. Updatable applications whose frequency of use falls within a predefined range will be categorized using a use classification associated with the predefined range. For example, an application may be classified as a daily use application, a weekly use application, a monthly use application, etc. based on the average number of times per day or week the application is used. The pattern module 210 may comprise hardware circuits, executable code operating on a processing device, or a combination of hardware circuitry and executable code.

The policy module 215, in one embodiment, creates an application update policy 160 for each updatable application based on the pattern of use for each updatable application. As used herein, an application update policy refers to a set of rules governing when an installed, updatable application is to be updated. Specifically, the application update policy may indicate when to check for updates, when to download updates, and/or when to apply/install updates for each updatable application 150.

In certain embodiments, the various application update policies 160 created for each updatable application are combined into a single update policy. In other embodiments, the electronic device 101 includes a separate application update policy 160 for each updatable application 150. In still other embodiments, the electronic device 101 may include a plurality of application update policies 160 wherein each updatable application 150 is associated with one of the plurality of application update policies 160.

In certain embodiments, the application update policy 160 may indicate whether to enable or disable an automatic update function for each updatable application 150. As used herein, an automatic update function refers to a function of an updatable application 150 (or an application manager handling the updatable application 150) that automatically checks for, downloads, and installs updates, for example on a periodic basis. In other embodiments, the application of the policy 160 governs the automatic update function, such as dictating when to check for, download, and/or install updates for an updatable application 150. For example, an application update policy 160 for a particular updatable application 150 may indicate to defer certain application updates because the updatable application 150 is used infrequently.

In some embodiments, the policy module 215 may generate the application update policy 160 based on circumstances relating to the use of an updatable application 150. For example, the application update policy 160 include one or more criteria to be met before checking for, downloading, and/or installing an update. In certain embodiments, the policy module 215 may generate one or more feature update policies for independently updatable features of an updatable application. The policy module 215 may comprise hardware circuits, executable code operating on a processing device, or a combination of hardware circuitry and executable code.

The feature module 220, in one embodiment, identifies one or more features of an updatable application 150 that are independently updatable. As used herein, and independently updatable feature of an updatable application 150 refers to a feature or subcomponent of the updatable application 150 that is able to be updated independently of other features/subcomponents of the updatable application 150. For example, if the updatable application 150 includes a suite of productivity applications, such as a word processor, spreadsheet application, and/or presentation program, each productivity application may be updatable independently of the others. In such a situation, the feature module 220 may identify independently updatable productivity applications.

In some embodiments, the feature module 220 identifies the one or more independently updatable application features by examining metadata associated with the updatable application 150, by checking an activity log 155 associated with the updatable application 150, and/or by querying the application server 145. In certain embodiments, the feature module 220 may also identify one or more independently updatable application features by examining metadata associated with a received application update and/or by querying the update server 135.

In certain embodiments, the feature module 220 identifies a pattern of use for each independently updatable feature of an updatable application 150. In other embodiments, the feature module 220 signals the pattern module 2102 identify a pattern of use for each independently updatable feature of the updatable application 150. As discussed above, the pattern of use refers to how often a user (or application on the electronic device 101) uses the feature or times/locations/persons associated with use of the feature.

In addition, the feature module 220 may generate a feature update policy for each independently updatable feature of the updatable application 150. Alternatively, the feature module 220 may signal the policy module 215 to create a feature update policy for each independently updatable feature of the updatable application 150. For example, a first application may include three independently updatable features, but the user may only regularly use one of the independently updatable features. Here, a feature update policy may be generated for the regularly used feature causing it to be updated on a frequent (e.g., weekly) basis and the remaining independently updatable features may be updated on a less frequent (e.g., monthly) basis.

The feature module 220 may comprise hardware circuits, executable code operating on a processing device, or a combination of hardware circuitry and executable code. While depicted as a separate component of the update controller 115, in certain embodiments the feature module 220 may be a part of the application module 205, pattern module 210, and/or the policy module 215.

The update module 225, in one embodiment, receives an update for one or more updatable applications 150. For example, the update module 225 may receive an application update from the update server 135 (e.g., via the network interface 130). Alternatively, the update module 225 may receive notification of an available update for one or more updatable applications 150.

At a time indicated by the application of the policy 160, the update module 225 may apply available updates to an updatable application 150. In one embodiment, applying available updates includes retrieving and applying an application update stored in the memory 110. In another embodiment, applying available updates includes downloading and applying an application update from the update server 135.

In some embodiments, the update module 225 may analyze the received (or available) update and determine a type or significance of the update. For example, the available update may be a major revision to the application (or a feature thereof), a minor revision, a patch, a security update, and the like. Examples of major revisions include, but are not limited to, service packs, new versions, new baselines, revisions that add or remove functionality, complete rewrites of code, and revisions which may cause incompatibility with interfacing systems. Examples of minor revisions include, but are not limited to, patches, bug fixes, and changes that do not affect the application's Application Programming Interface ("API"). As used herein, a security update may be categorized separately from minor revisions, the security update distinguishable by addressing security vulnerabilities of the updatable application 150, as opposed to other patches or fixes.

In certain embodiments, the update module 225 may override an application update policy 160 to update an updatable application 150 with a major revision or security update. Accordingly, the update module 225 may receive an update (or indication of an available update) that is a major revision or security update and immediately apply the update. However, if the update is not a major revision or security update, the update module 25 does not override the application update policy 160.

In some embodiments, the update module 225 maintains a list of available application updates for each updatable application 150. In certain embodiments, one or more of the available application updates may be downloaded to the electronic device 101 (e.g., stored in the memory 110). An application update policy 160 may indicate that updates for a particular updatable application 150 are to be postponed (deferred), wherein the update module 225 may delete a postponed update and download it again when the updatable application 150 is to be updated according to the application update policy 160. The update module 225 may comprise hardware circuits, executable code operating on a processing device, or a combination of hardware circuitry and executable code. While described as a separate component of the update controller 115, in certain embodiments the update module 225 may be a part of the policy module 215.

The category module 230 categorizes the updatable applications 150 into one of a plurality of application categories. For example, the category module 230 may group updatable applications 150 according to their frequency of use, according to their application type (e.g., games, productivity applications, messaging applications, etc.), according to circumstances of their use, and the like. Upon categorizing the updatable applications 150, the policy module 215 may define an application update policy for each application category, such that each application and an application category uses the same application update policy.

In some embodiments, the category module 230 analyzes metadata of the updatable applications 150 in order to determine their category. In certain embodiments, the category module 230 analyzes an activity log 155 in order to categorize the updatable applications 150. In one embodiment, the category module 230 assigns each updatable application 150 to a predefined application category. In another embodiment, the category module 230 dynamically determines the number of application categories and criteria for belonging to a particular application category. As discussed above, the criteria may include, but is not limited to, frequency of use, application type, times (e.g., time of day) an application is used, locations where an application is used, other individuals/devices present when the application is used, and the like. The category module 230 may comprise hardware circuits, executable code operating on a processing device, or a combination of hardware circuitry and executable code. While depicted as a separate component of the update controller 115, in certain embodiments the category module 230 may be a part of the policy module 215.

The trigger module 235, in one embodiment, identifies one or more circumstances associated with use of an updatable application 150 and defines triggers for updating the updatable application 150. For example, the trigger module 235 may identify a location associated with use of a particular updatable application 150. As another example, the trigger module 235 may identify a calendar event associated with use of a specific updatable application 150. Upon identifying the circumstances use, the trigger module 235 defined an update trigger, the update trigger being a set of rules or criteria which, when met, initiate updating the updatable application 150.

In some embodiments, the update trigger is a path leading to a location associated with use of the updatable application 150. In a related embodiment, the update trigger may be an area surrounding the location associated with use of the updatable application 150. Here, the trigger module 235 may monitor the location of the electronic device 101 and when movement of the electronic device 101 is consistent with the path leading to the location, or when the location of the electronic device 101 is within the trigger area, then the trigger module 235 signals the update controller 115 (e.g., an update module 225 within the update controller 115) to check for, download, and/or apply updates for the updatable application 150.

In certain embodiments, the update trigger maybe a predetermined amount of time prior to a calendar item associated with use of a specific updatable application 150. In a related embodiment, the update trigger may be a predetermined amount of time prior to when use of the specific updatable application 150 is expected. Here, the trigger module 235 may signal the update controller 115 (e.g., an update module 225 within the update controller 115) to check for, download, and/or apply updates for the updatable application 150 when the predetermined time is reached.

In some embodiments, the trigger module 235 provides one or more update triggers to the policy module 215, wherein the policy module 215 incorporates the update trigger(s) into the application update policy 160. For example, the application update policy 160 may defer updates for a first updatable application 150 until a predetermined time prior to expected use of the first updatable application 150. As another example, the application update policy 160 may postpone updates for a second updatable application 150 until the apparatus is within a predetermined distance of a location associated with use of the second updatable application 150. The trigger module 235 may comprise hardware circuits, executable code operating on a processing device, or a combination of hardware circuitry and executable code. While described as a separate component of the update controller 115, in certain embodiments the trigger module 235 may be a part of the policy module 215 and/or the update module 225.

The calendar module 240, in one embodiment, analyzes use of an updatable application 150 to identify usage patterns in time. For example, the calendar module 240 may correlate use of the updatable application 150 with certain times of day, with certain calendar items, and the like. The calendar module 240 may access the user's calendar and/or the activity log 155 to identify usage patterns in time.

The calendar module 240 may indicate to the trigger module 235 any identified usage patterns in time for an updatable application 150, wherein the trigger module 235 may define one or more update triggers based on the usage patterns in time. The calendar module 240 may comprise hardware circuits, executable code operating on a processing device, or a combination of hardware circuitry and executable code. While depicted as a part of the trigger module 235, in certain embodiments the calendar module 240 may be a separate component of the update controller 115.

The location module 245, in one embodiment, analyzes use of an updatable application 150 to identify usage patterns in space (e.g., location). For example, the location module 245 may correlate use of the updatable application 150 with certain locations, when certain paths are followed, and the like. As used herein, a path refers to a series of locations traveled one after another. In some embodiments, the location module 245 accesses one or more activity logs 155 to identify usage patterns in space.

The location module 245 may indicate to the trigger module 235 any identified usage patterns in space for an updatable application 150 (e.g., paths or locations associated with its use), wherein the trigger module 235 may define one or more update triggers based on the usage patterns in time. The location module 245 may comprise hardware circuits, executable code operating on a processing device, or a combination of hardware circuitry and executable code. While depicted as a part of the trigger module 235, in certain embodiments the location module 245 may be a separate component of the update controller 115.

FIG. 3A depicts an activity log 300 used to control application updates, according to embodiments of the disclosure. The activity log 300 may one embodiment of the activity log 1.5 discussed above, with reference to FIG. 1. In certain embodiments, the activity log 300 is generated by an operating system running on the electronic device 101, an activity manager running on the electronic device 101, or the update controller 115. The activity log 300 may be generated by monitoring activity (e.g., usage) of the updatable applications 150 installed on the electronic device 101.

As depicted, the activity log 300 includes a plurality of entries 325, each entry 325 having a plurality of fields including an application ID field 305, and application name field 310, usage statistics field 315, and an application type field 320. The application ID field 305 includes an application identifier that uniquely identifies an updatable application 150 installed on the electronic device 101.

The application name field 310 includes an application name identifying and updatable application 150 installed on the electronic device 101. In certain embodiments, the application name is the same as the application identifier. In such embodiments, the application ID field 305 and application name field 310 may be combined into a single field. The application type field 320 identifies an application type, such as messaging application, media application, gaming application, productivity application, web browser, social media application, travel/location application, utility/tool, and the like.

The activity log 300 includes usage statistics contained in a usage statistics field 315 for each identified application. The usage statistics relate to usage of the application, and may include a rate (or frequency) of use, a date/time of use, and a location of use. The usage statistics may also indicate individuals or devices nearby when the application was used, calendar items coinciding with use of the application, a duration of use, and the like. The usage statistics may be gathered by the operating system, application manager, or update controller 115. From the usage statistics, the pattern module 210 identifies a pattern of use for each updatable application 150.

In certain embodiments, the user statistics do not include a rate of use, but an entry may be added to the activity log 300 each time an application is used. In this way, the pattern module 210 may calculate a pattern of use (e.g., a frequency of use) from the activity log 300. Additionally, the trigger module 235 may analyze the usage statistics in the activity log 300 to identify circumstances associated with use of the application, such as a particular location, particular time of day, correlation with the calendar event, and the like.

FIG. 3B depicts categorizing applications, according to embodiments of the disclosure. Here, the applications from the activity log 300 have been categorized into one of the plurality of application categories. In some embodiments, application categories are predefined. In other embodiments, application categories may be dynamically generated. In the depicted embodiment, the plurality of application categories include at least a media application category 335, gaming application category 340, and productivity application category 345. Each application category 335-345 is associated with a category specific update policy 350. The category specific update policies 350 may be embodiments of the application update policy 160 discussed above.

A category specific update policy 350 is applicable to every application included in an application category. For example, each application in the media application category 335 will use the same category specific update policy. The category specific update policies 350 may be different for each of the plurality of application categories. In one embodiment, each category specific update policy 350 is derived using aggregate usage statistics of the updatable applications 150 assigned to the application category area. In another embodiment, a category specific update policy 350 may be derived using usage statistics of a most used, a least used, or a median-usage application.

In certain embodiments, the category specific update policy 350 only applies when a threshold number (or ratio) of updatable applications 150 within the application category 335-345 have the similar frequencies of use. For example, as discussed above rates of use may be classified as daily use, weekly use, monthly use, etc. Where threshold number (or ratio) of updatable applications 150 within the application category have the same rate of use (e.g., daily usage, weekly usage, monthly sheets, etc.) then a category specific update policy 350 may be created and applied to the updatable applications 150 within the application category.

However, if the threshold number (or ratio) is not met, then one or more applications having higher than average rates of use may be removed from the application category 335-345 and given an individual application update policy 160. For example, if the user has ten gaming applications installed and only uses two of them on a regular (e.g., daily or weekly) basis, then the two gaming applications being regularly used may be assigned individual application update policies 160 while the remaining gaming applications may be grouped together and assigned a category specific update policy 350. Here, the category specific update policy 350 does not apply to all applications of the same application type (e.g., as identified by the application type field 320), but rather applies to all updatable applications 150 listed as belonging to the application category 335-345.

Figure 4:
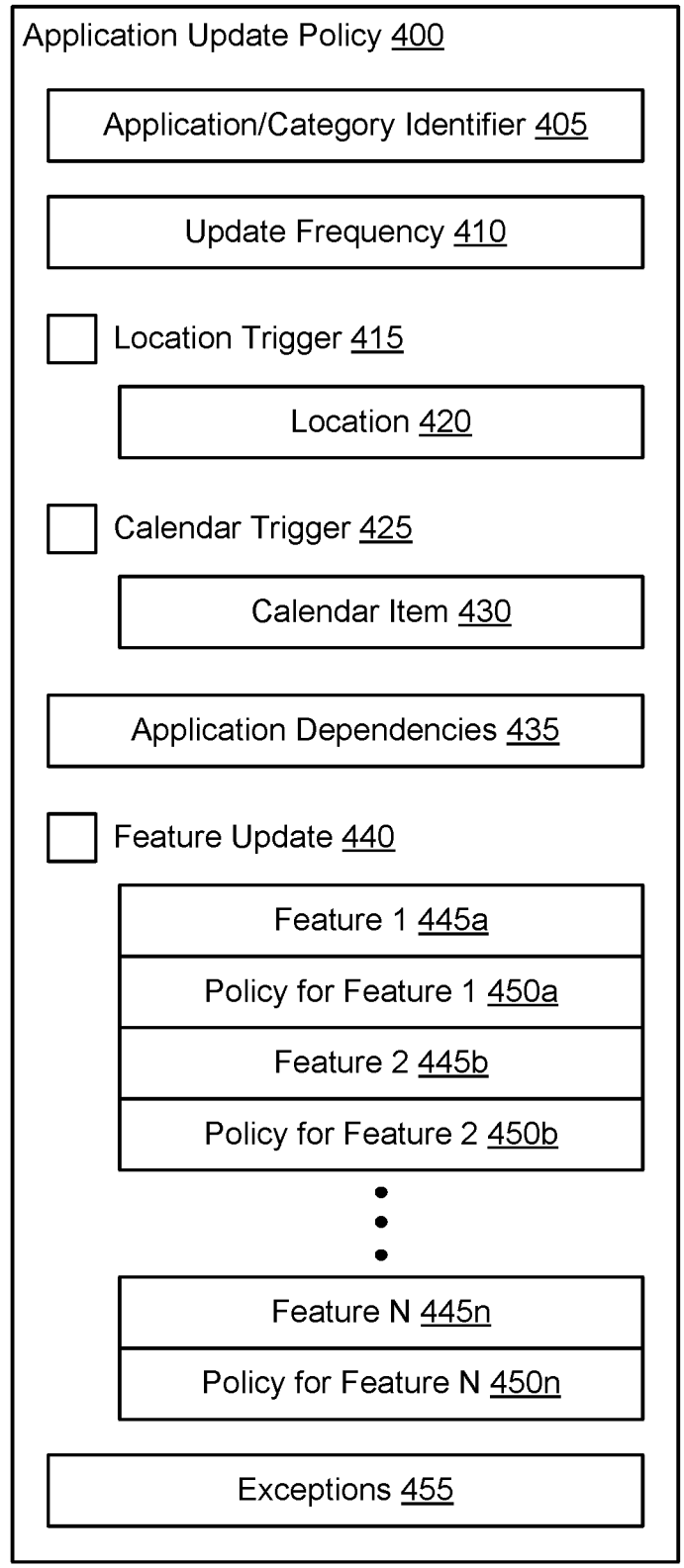
FIG. 4 is a diagram illustrating an application update policy for controlling application updates.

FIG. 4 depicts an application update policy 400, according to embodiments of the disclosure. The application update policy 400 may apply to a specific application, to an application class or category, and the like. In certain embodiments, the application update policy 400 is generated by the electronic device 101, specifically by one of the update controller 115, the policy module 215, and the processor 105. The application update policy 400 may be one embodiment of the application update policy 160 described above.

In the depicted embodiment, the application update policy 400 includes an application/category identifier field 405 and an update frequency field 410. The application/category identifier field 405 identifies a specific application or a specific category to which the application update policy 400 applies. For example, the application/category identifier field 405 may include an application ID or application name, as discussed above with reference to FIG. 3A. As another example, the application/category identifier field 405 may include an identifier belonging to an application category, such as the application categories 335-345 discussed above with reference to FIG. 3B. In certain embodiments, the application/category identifier field 405 may identify an independently updatable feature of an updatable application.

The update frequency field 410 indicates how often the application is to be updated. In one embodiment, the update frequency field 410 includes a value (e.g., a number of hours, days, weeks, etc.) defining an interval for updating the application. In another embodiment, the update frequency field 410 includes a rate (e.g., once per week, twice a month, etc.) for updating the application. In still other embodiments, the update frequency field 410 may include a pointer that links to another application update policy 400 or a location in memory containing a rate, interval, or other value indicating how often the application is to be updated.

For example, the update frequency field 410 may point to a category specific update policy 350 so that the application identified at the application/category identifier field 405 is updated at the rate/interval indicated in the category specific update policy 350. As another example, the update frequency field 410 may point to a rate/interval stored in memory for use by all applications having a frequency of use that falls within a particular use classification (e.g., daily use application, weekly use application, etc.).

In some embodiments, the application update policy 400 may include a location trigger option 415 and an associated location field 420. When the location trigger option 415 is selected, the application update policy 400 restricts checking for, downloading, and/or applying updates to the identified application until the electronic device 101 is within a predetermined distance of the location indicated by the location field 420. In one embodiment, the location field includes a set of coordinates, such as latitude/longitude coordinates. In another embodiment, the location field includes a place name, street address, or landmark. In certain embodiments, the location field 420 may include a route or path or may indicate the predetermined distance.

In certain embodiments, the application update policy 400 may include a calendar trigger option 425 and an associated calendar item field 430. When the calendar trigger option 425 is selected, the application update policy 400 restricts checking for, downloading, and/or applying updates to the identified application until the electronic device 101 is within a predetermined timeframe of the event indicated by the calendar item field 430. The calendar item includes a meeting, a reoccurring event, or the like. In one embodiment, the calendar item may be found in the user's calendar application/feature. In another embodiment, the calendar item may refer to a pattern of activity that is not found in the user's calendar application/feature. In a further embodiment, the calendar item may refer to an event hidden from the user's calendar.

In certain embodiments, the application update policy 400 may list one or more application dependencies 435 indicating other applications upon which the identified application is dependent. Where implemented, the application dependencies 435 may allow the other applications to be updated at the same interval (or at a shorter interval) as the identified application, even if the other applications are used less frequently than the identified application.

In some embodiments, the application update policy 400 may include a feature update option 440. As discussed above, certain updatable applications 150 may include independently updatable features. In such embodiments, the feature more often used may be updated more often, while the features less often used may be updated less often. When the feature update option 440 selected, the application update policy 400 allows independently updatable features to be updated at different intervals, in response to different triggers, and the like.

Additionally, when the feature update option 440 selected, the application update policy 400 includes fields for identifying the independently updateable features and indicating an update policy for each identified feature. In the depicted embodiment, the application update policy 400 includes at least a first feature field 445a, a second feature field 445b, and an Nth feature field 445n (collectively referred to as "feature fields 445") which identify a first independently updatable feature, second independently updatable feature, and Nth independently updatable feature, respectively. Additionally, the application update policy 400 includes a first feature policy field 450a, a second feature policy field 450b, and an Nth feature policy field 450n (collectively referred to as "feature policy fields 450") which correspond to update policies for the first independently updatable feature, second independently updatable feature, and Nth independently updatable feature, respectively.

In one embodiment, the feature policy fields 450 point to feature update policies located in memory 110 that are specific to the independently updatable feature identified in the feature fields 445. In another embodiment, the feature policy fields 450 include feature update polices embedded therein. The feature update policies may be substantially similar to the application update policies 160, 400 and govern the updating of the independently updatable application features.

In some embodiments, the application update policy 400 represent a default update policy for the application, while the feature update option 440 allows for one or more independently updateable features to be updated at an interval different from the rest of the updatable application. For example, a frequently used feature may be updated on a weekly basis, while the rest of the application may be update on a monthly or twice-a-month basis. As another example, independently updatable features that have never been used may be updated on a quarterly basis, while the rest of the application may be update on a weekly basis.

In certain embodiments, the application update policy 400 may include one or more exceptions 455. The exceptions 455 describe circumstances under which the application update policy 400 is to be overridden or ignored. For example, an exception 455 may indicate a location (or calendar event) during which updates are to be postponed. As another example, an exception 455 may describe when a location requirement is to be ignored due to an overriding calendar event, or vice versa.

Figure 5:
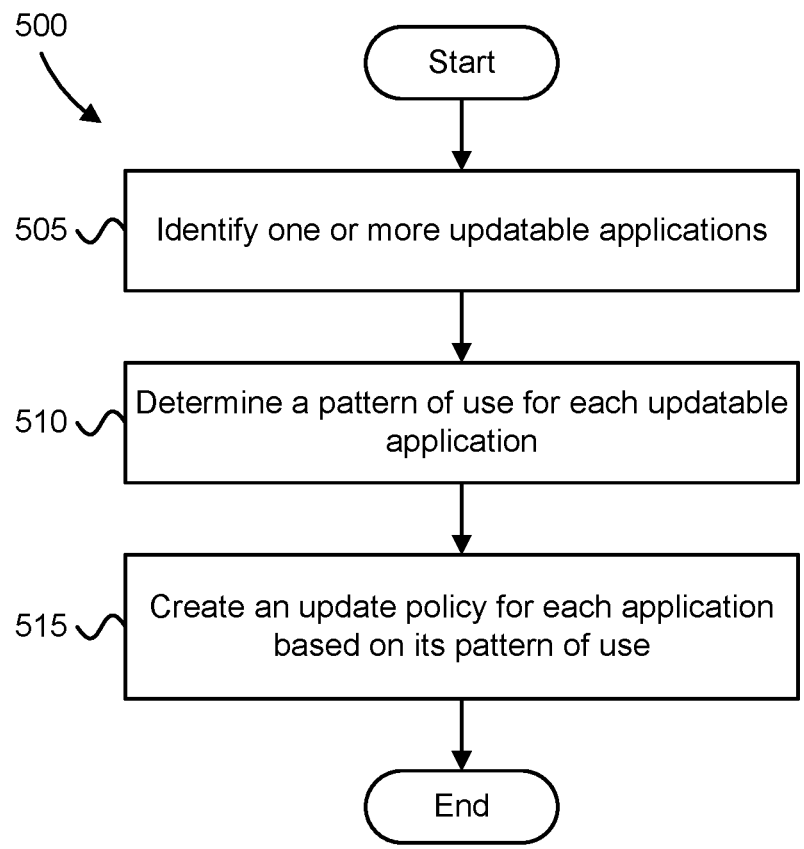
FIG. 5 is a schematic flow chart diagram illustrating one embodiment of a method for controlling application updates.

FIG. 5 is a schematic flow chart diagram illustrating a method 500 for controlling application updates, according to embodiments of the disclosure. In one embodiment, the method 500 is performed by the electronic device 101. In another embodiment, the method 500 may be performed by the apparatus 200. Alternatively, the method 500 may be performed by a processor 105 and a computer readable storage medium, such as the memory 110. The computer readable storage medium may store code that is executed on the processor 105 to perform the functions of the method 500.

The method 500 begins and identifies 505 one or more updateable applications. In one embodiment, the application module 205 identifies 505 the one or more updateable applications. Identifying 505 one or more application may include accessing a list of applications installed on an electronic device 101 and determining, for each list application, whether a listed application is an updatable application. For example, determining whether an installed application is an updatable application may include analyzing analyzes metadata of an installed application.

The method 500 determines 510 a pattern of use for each updatable application. In one embodiment, the pattern module 210 determines 510 the pattern of use for each updatable application. The pattern of use may describe an average number of times the updatable application is used within a given time period. Determining 510 the pattern of use may include analyzing an activity log 300 to determine a pattern of use for each updatable application. Alternatively, determining 510 the pattern of use may include querying an operating system, application manager, or the updatable application itself for usage statistics.

The method 500 creates 515 an application update policy for each updateable application. The method 500 ends. In one embodiment, the policy module 215 creates 515 the application update policies. Creating 515 an application update policy may include defining a set of rules governing when an updatable application is to be updated.

An application update policy may dictate an interval at which updates are to be checked for, downloaded, and/or installed. Additionally, an application update policy may dictate location criteria to be met before checking for, downloading, and/or installing an update. For example, an update policy may indicate that updates are to be checked for, downloaded, and/or applied on a monthly basis in response to the rate of use being less than once per week. In some embodiments, the update policy indicates that an automatic update feature is to be disabled due to the rate of use being below threshold amount.

Figure 6:
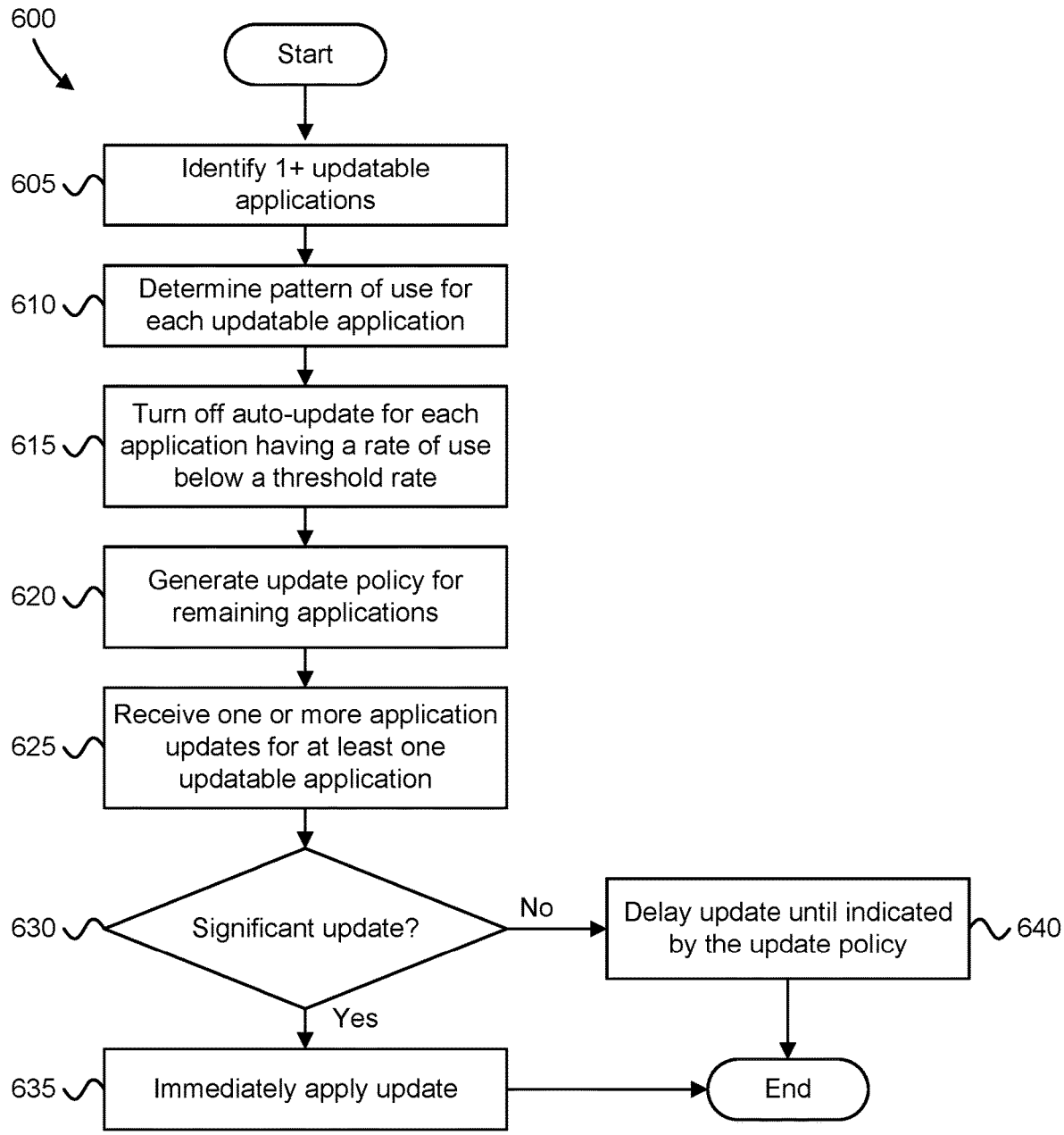
FIG. 6 is a schematic flow chart diagram illustrating an embodiment of a method for controlling application updates including updating based on the significance of an available update.

FIG. 6 is a schematic flow chart diagram illustrating a method 600 for controlling application updates, according to embodiments of the disclosure. In one embodiment, the method 600 is performed by the electronic device 101. In another embodiment, the method 600 may be performed by the apparatus 200. Alternatively, the method 600 may be performed by a processor 105 and a computer readable storage medium, such as the memory 110. The computer readable storage medium may store code that is executed on the processor 105 to perform the functions of the method 600.

The method 600 begins and identifies 605 one or more updateable applications. In one embodiment, the application module 205 identifies 605 the one or more updateable applications. Identifying 605 one or more application may include accessing a list of applications installed on an electronic device 101 and determining, for each list application, whether a listed application is an updatable application. For example, the application module 205 may query an operating system, an update server 135, and/or an application server 145 to identify 605 one or more updatable applications installed on the electronic device 101.

The method 600 determines 610 a pattern of use for each updatable application. In one embodiment, the pattern module 210 determines 610 the pattern of use for each updatable application 150. The pattern of use may describe an average number of times the updatable application 150 is used within a given time period. Determining 610 the pattern of use may include analyzing an activity log 300 to determine a pattern of use for each updatable application. Alternatively, determining 610 the pattern of use may include querying an operating system, application manager, or the updatable application 150 itself for usage statistics.

The method 600 turns off 615 an automatic update ("auto-update") function for each updatable application 150 having a rate of use below a threshold rate. In one embodiment, the update controller 115 turns off 615 the auto-update function. Turning off 615 an auto-update function for each updatable application 150 having a rate of use below a threshold rate may include setting parameters at the operating system or an application manager in order to disable the auto-update function of each updatable application 150 having a rate of use below the threshold rate. Alternatively, turning off 615 the auto-update function may include just parameters of the updatable application 150 to disable the auto-update function.

The method 600 generates 620 an application update policy for the remaining updateable applications 150 (e.g., for all updateable applications 150 whose rate of use is greater than or equal to the threshold rate). As discussed above, the application update policies may dictate an interval and one or more criteria for checking for, downloading, and/or installing application updates. In one embodiment, the policy module 215 generates 620 the application update policy. Generating 620 an application update policy may include setting parameters governing an automatic update function for those updatable applications 150, for example at the operating system, and application manager, or the updatable application 150 itself.

The method 600 receives 625 one or more application updates for at least one updatable application. In one embodiment, the update module 225 receives 625 the one or more application updates. Receiving 625 one or more application updates for at least one updatable application may include the update server 135 pushing an update to the electronic device 101. Alternatively, receiving 625 one or more application updates may include checking for and downloading at least one application update from the update server 135.

At this point, the method 600 determines 630 whether a received application update is a significant update. In one embodiment, an application update is considered a significant update when it is a security update or a major revision, as discussed above. The update module 225 may determine 630 whether a received application update is a significant update.

In response to the received update being a significant update, the method 600 proceeds to immediately apply 635 the received update. In one embodiment, the update module 225 and/or update controller 115 immediately applies 635 the received update. Immediately applying 635 the received update may include the update controller 115 overriding a previously defined application update policy 160 to install the received update.

Otherwise, in response to the received update not being a significant update, the method 600 delays 640 the update until indicated by the update policy. In one embodiment, the update module 225 delays 640 the update. Delaying 640 the application update may include logging in a file that an application update is available, but not installed. In some embodiments, delaying 640 the update includes deleting the received application update, and downloading the application update again when indicated by the application update policy. The method 600 ends.

Figure 7:
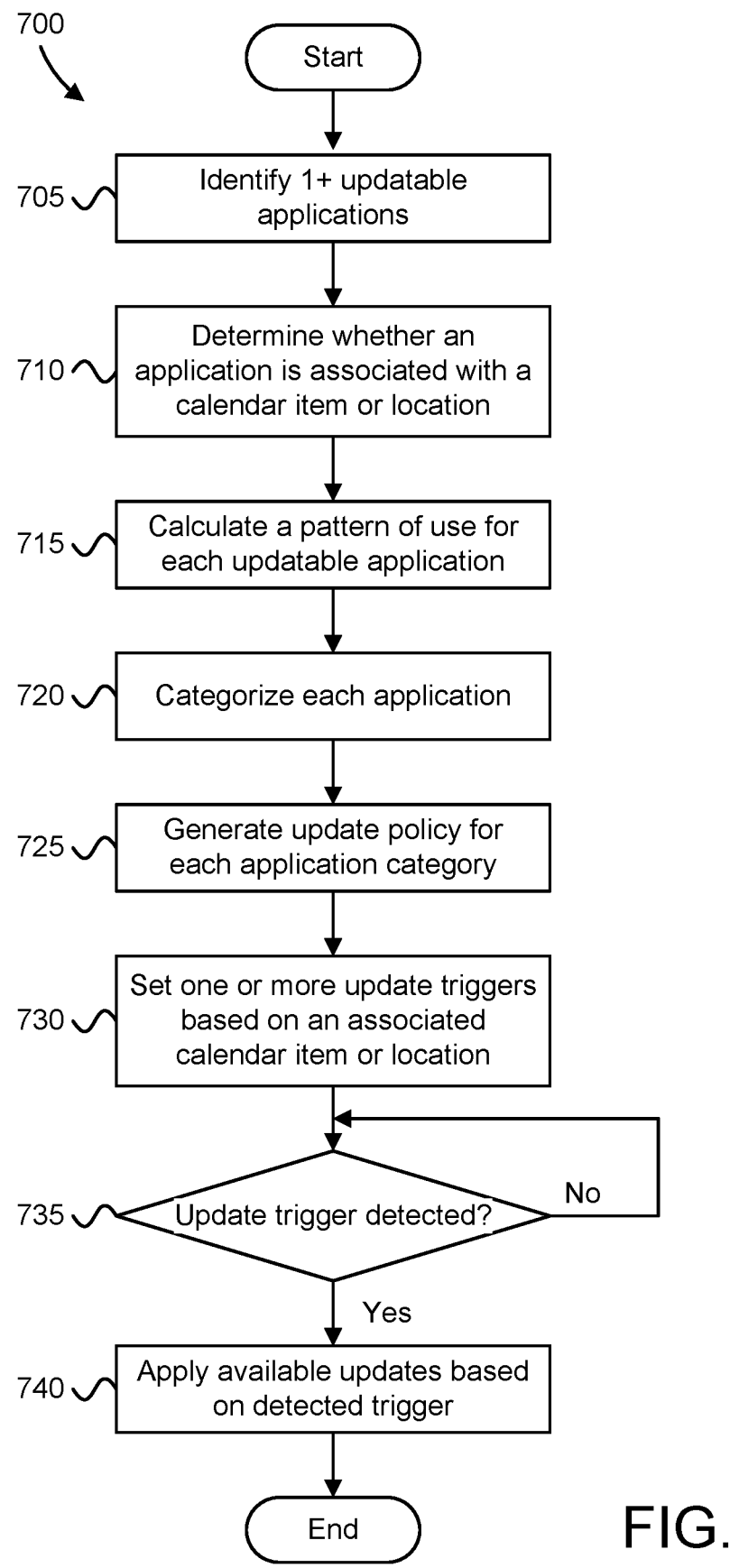
FIG. 7 is a schematic flow chart diagram illustrating one embodiment of a method for controlling application updates including updating based on a trigger.

FIG. 7 is a schematic flow chart diagram illustrating a method 700 for switching between pressure-based cursor control and position-based cursor control, according to embodiments of the disclosure. In one embodiment, the method 700 is performed by the electronic device 101. In another embodiment, the method 700 may be performed by the apparatus 200. Alternatively, the method 700 may be performed by a processor 105 and a computer readable storage medium, such as the memory 110. The computer readable storage medium may store code that is executed on the processor 105 to perform the functions of the method 700.

The method 700 begins and identifies 705 one or more updateable applications. In one embodiment, the application module 205 identifies 705 the one or more updateable applications. Identifying 705 one or more application may include accessing a list of applications installed on an electronic device 101 and determining, for each list application, whether a listed application is an updatable application.

The method 700 determines 710 whether an updatable application is associated with a particular calendar item or location. In one embodiment, the category module 230, trigger module 235, calendar module 240, and/or location module 245 determines 710 whether an updatable application is associated with a particular calendar item or location. Determining 710 whether an updatable application is associated with a particular calendar item or location may include analyzing an activity log 300 to associate calendar items, times, and locations with application usage.

The method 700 calculates 715 a pattern of use for each updatable application. The pattern of use may describe an average number of times the updatable application is used within a given time period. In one embodiment, the pattern module 210 calculates 715 the pattern of use for each updatable application. Calculating 715 the pattern of use may include analyzing an activity log 300 to determine a pattern of use for each updatable application. Alternatively, calculating 715 the pattern of use may include querying an operating system, application manager, or the updatable application itself for usage statistics.

The method 700 categorizes 720 each application. In one embodiment, the category module 230 categorizes 720 each application. Categorizing 720 each application may include identifying attributes of an application, such as an application type (e.g., game, utility, productivity application, communication/messaging application, etc.), and assigning the application to an application category based on the identified attributes. In certain embodiments, categorizing 720 each application may include assigning each application to a predefined application category.

The method 700 generates 725 an application update policy for each application category. In one embodiment, the policy module 215 generates 725 the application update policy. Generating 725 an application update policy for each application category may include defining a set of rules dictating when updatable applications in each application category are to be updated. An application update policy may dictate an interval at which updates are to be checked for, downloaded, and/or installed. Additionally, an application update policy may dictate location criteria to be met before checking for, downloading, and/or installing an update.

The method 700 sets 730 one or more update triggers based on an associated calendar item or location. In one embodiment, the trigger module 235 sets 730 the one or more update triggers. Setting 730 one or more update triggers may include defining one or more criteria that are to be met before an application is updated. For example, an update trigger may relate to a location associated with application use, a time or calendar event associated with application use, on individual/device associated with application use, or the like.

Next, the method 700 monitors 735 for an update trigger. In one embodiment, the trigger module 235 monitors 735 for the update trigger. In one embodiment, monitoring 735 for an update trigger may include monitoring the location of the electronic device 101. In another embodiment, monitoring 735 for an update trigger may include searching for relevant calendar items in the users calendar.

In response to detecting an update trigger, the method 700 proceeds to apply 740 available updates based on the trigger. In one embodiment, the update controller 115 and/or update module 225 applies 740 available updates based on the trigger. For example, applying 740 available updates based on the trigger may include checking for, downloading, and/or installing available updates in response to the electronic device 101 being within a predetermined distance of a location associated with application use. As another example, applying 740 available updates based on the trigger may include checking for, downloading, and/or installing available updates a predetermined time before a calendar event associated with application use. The method 700 ends.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a processor; and
a memory that stores code executable by the processor to:
identify one or more updatable applications installed on the apparatus;
identify a pattern of use for each updatable application of the one or more updatable applications;
create an application update policy for each updatable application of the one or more updatable applications based on the pattern of use for each updatable application of the one or more updatable applications, wherein the application update policy includes an update frequency indicating a time interval for updating the updatable application, and wherein the time interval is shorter when the pattern of use for the updatable application indicates a rate of use greater than or equal to a threshold usage rate and the time interval is longer when the pattern of use for the updatable application indicates a rate of use less than the threshold usage rate;
receive an indication of an application update for a specific updatable application whose pattern of use indicates a rate of use less than the threshold usage rate;
determine whether the application update for the specific updatable application is a significant application update, wherein the significant application update is one of a major revision and a security update;
apply the application update for the specific updatable application to the specific updatable application according to the time interval indicated by the application update policy of the specific updatable application in response to the application update for the specific updatable application not being a significant application update; and
override the application update policy to apply the application update at an earlier time in response to the application update for the specific updatable application being a significant application update.

2. The apparatus of claim 1, wherein the processor further categorizes the one or more updatable applications into one of a plurality of application categories, and wherein each application in an application category has the same application update policy.

3. The apparatus of claim 1, wherein applying the application update for the specific updatable application to the specific updatable application according to the time interval indicated by the application update policy of the specific updatable application in response to the application update for the specific updatable application not being a significant application update comprises postponing the application update for the specific updatable application.

4. The apparatus of claim 1, wherein creating the application update policy for each updatable application of the one or more updatable applications based on the pattern of use for each updatable application of the one or more updatable applications comprises disabling an automatic application update feature for a particular updatable application only in response to the pattern of use for the particular updatable application indicating a rate of use less than a threshold usage rate.

5. The apparatus of claim 1, wherein the processor further identifies a calendar item associated with use of a specific updatable application, and wherein the application update policy defers applying application updates for the specific updatable application until a predetermined time prior to the calendar item.

6. The apparatus of claim 1, wherein the processor further identifies a location associated with use of a specific updatable application, and wherein the application update policy defers applying application updates for the specific updatable application until the apparatus is within a predetermined distance of the location.

7. The apparatus of claim 1, wherein overriding the application update policy to apply the application update at an earlier time in response to the application update for the specific updatable application being a significant application update comprises immediately updating the specific updatable application at once.

8. The apparatus of claim 1, wherein the processor further:
identifies one or more features of an updatable application, wherein each feature of the one or more features of the updatable application is independently updatable; and
identifies a pattern of use for each feature of the one or more features of the updatable application, wherein creating an application update policy for the updatable application comprises creating a feature update policy for each feature of the one or more features of the updatable application based on the pattern of use for each feature of the one or more features of the updatable application.

9. The apparatus of claim 1, wherein the application update policy of a first updatable application applies application updates to the first updatable application at a first rate of use and the application update policy of a second updatable application applies application updates to the second updatable application at a second rate of use, and wherein the first rate of use is greater than the second rate of use in response to the first updatable application being used more often than the second updatable application.

10. A method comprising:
identifying, using a processor, one or more updatable applications installed on a computing device;
identifying, using the processor, a pattern of use for each updatable application of the one or more updatable applications;
creating, using the processor, an application update policy for each updatable application of the one or more updatable applications based on the pattern of use for each updatable application of the one or more updatable applications, wherein the application update policy includes an update frequency indicating a time interval for updating the updatable application, and wherein the time interval is shorter when the pattern of use for the updatable application indicates a rate of use greater than or equal to a threshold usage rate and the time interval is longer when the pattern of use for the updatable application indicates a rate of use less than the threshold usage rate;
receiving, using the processor, an indication of an application update for a specific updatable application whose pattern of use indicates a rate of use less than the threshold usage rate;
determining, using the processor, whether the application update for the specific updatable application is a significant application update, wherein the significant application update is one of a major revision and a security update;

applying, using the processor, the application update for the specific updatable application to the specific updatable application according to the time interval indicated by the application update policy of the specific updatable application in response to the application update for the specific updatable application not being a significant application update; and overriding, using the processor, the application update policy to apply the application update at an earlier time in response to the application update for the specific updatable application being a significant application update.

11. The method of claim 10, further comprising:
categorizing the one or more updatable applications into one of a plurality of application categories, and wherein each application in an application category has the same application update policy.

12. The method of claim 10, wherein applying the application update for the specific updatable application to the specific updatable application according to the time interval indicated by the application update policy of the specific updatable application in response to the application update for the specific updatable application not being a significant application update comprises postponing the application update for the specific updatable application.

13. The method of claim 10, further comprising:
identifying a calendar item associated with use of a specific updatable application, wherein the application update policy defers applying application updates for the specific updatable application until a predetermined time prior to the calendar item.

14. The method of claim 10, further comprising:
identifying a location associated with use of a specific updatable application, wherein the application update policy defers applying application updates for the specific updatable application until the computing device is within a predetermined distance of the location.

15. The method of claim 10, wherein overriding the application update policy to apply the application update at an earlier time in response to the application update for the specific updatable application being a significant application update comprises immediately updating the specific updatable application at once.

16. The method of claim 10, further comprising:
identifying one or more features of an updatable application, wherein each feature of the one or more features of the updatable application is independently updatable; and
identifying a pattern of use for each feature of the one or more features of the updatable application, wherein creating an application update policy for the updatable application comprises creating a feature update policy for each feature of the one or more features of the updatable application based on the pattern of use for each feature of the one or more features of the updatable application.

17. The method of claim 16, wherein the feature update policy of a first feature applies updates to the first feature at a first time interval and the feature update policy of a second feature applies updates to the second feature at a second time interval, and wherein the first time interval is less than the second time interval in response to the first feature being used more often than the second feature.

18. A computer program product comprising a computer readable storage medium that is not a transitory signal and that stores code executable by a processor, the executable code comprising code to:
identify an updatable application installed on an electronic device;
identify a pattern of use for the updatable application;
generate an application update policy for the updatable application based on the pattern of use for the updatable application, wherein the application update policy includes an update frequency indicating a time interval for updating the updatable application, and wherein the time interval is shorter when the pattern of use for the updatable application indicates a rate of use greater than or equal to a threshold usage rate and the time interval is longer when the pattern of use for the updatable application indicates a rate of use less than the threshold usage rate;
receive an indication of an application update for a specific updatable application whose pattern of use indicates a rate of use less than the threshold usage rate;
determine whether the application update for the specific updatable application is a significant application update, wherein the significant application update is one of a major revision and a security update;
apply the application update for the specific updatable application to the specific updatable application according to the time interval indicated by the application update policy of the specific updatable application in response to the application update for the specific updatable application not being a significant application update; and
override the application update policy to apply the application update at an earlier time in response to the application update for the specific updatable application being a significant application update.

19. The computer program product of claim 18, further comprising code to:
enable an automatic application update function for a particular updatable application only in response to a pattern of use for the particular updatable application indicating a rate of use for the particular updatable application being above a threshold usage rate.

20. The computer program product of claim 18, further comprising code to:
disable an automatic application update function for a particular updatable application only in response to a pattern of use for the particular updatable application indicating a rate of use for the particular updatable application being below a threshold usage rate.

* * * * *